Nov. 4, 1924.
1,513,878
H. C. ANTHONY
STRAINER OR FILTERING DEVICE FOR WATER AND OTHER LIQUIDS
Filed Dec. 23, 1920 7 Sheets—Sheet 1
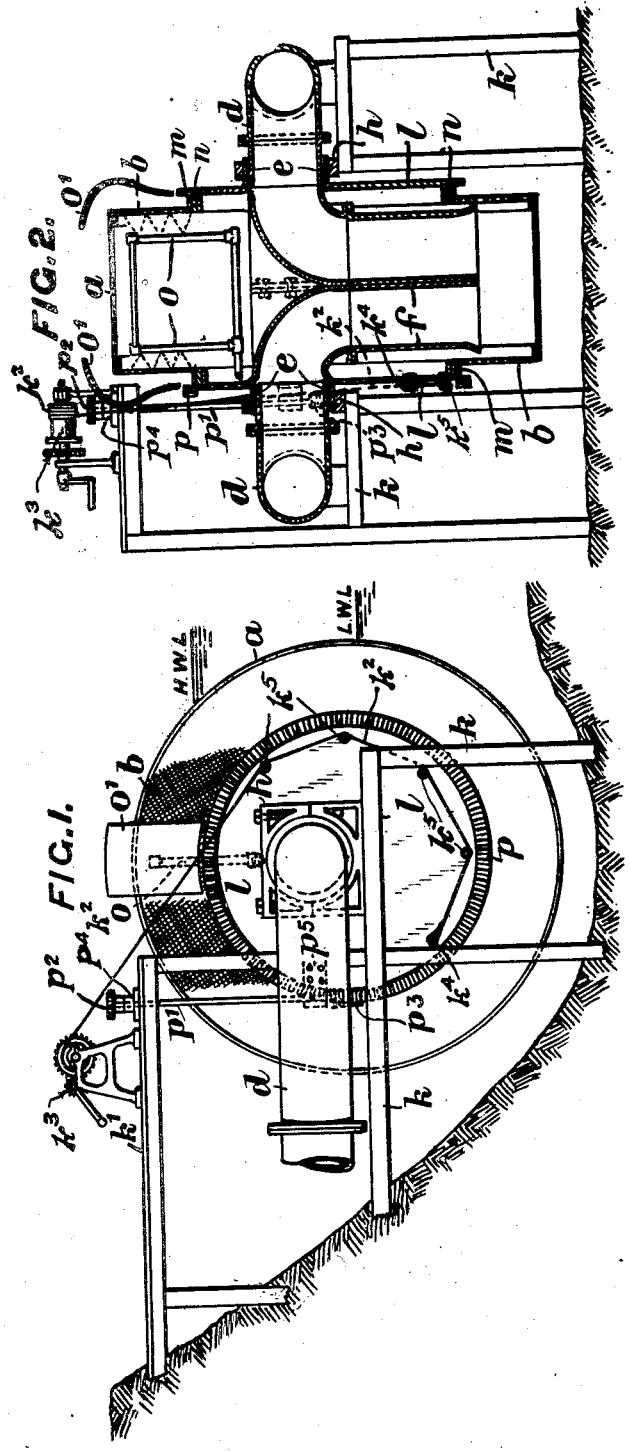
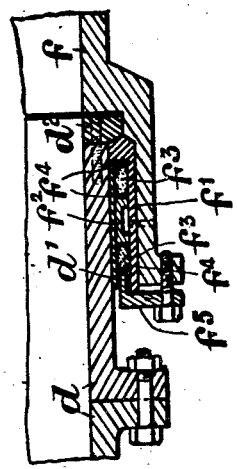

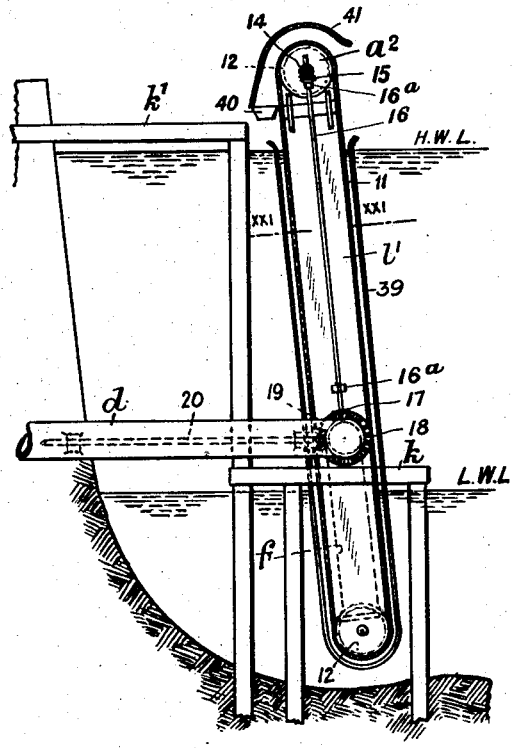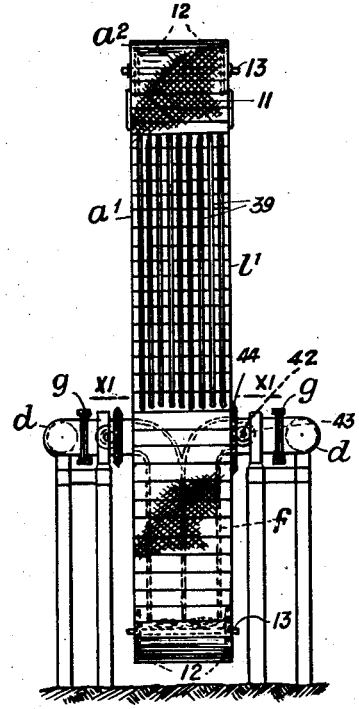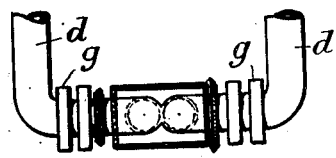

Nov. 4, 1924.
H. C. ANTHONY
STRAINER OR FILTERING DEVICE FOR WATER AND OTHER LIQUIDS
Filed Dec. 23, 1920   7 Sheets-Sheet 6
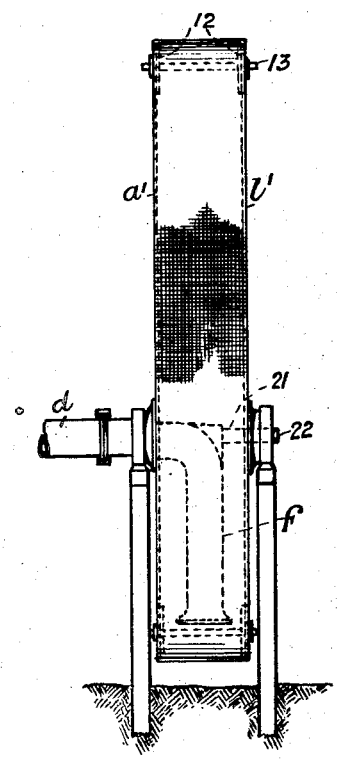
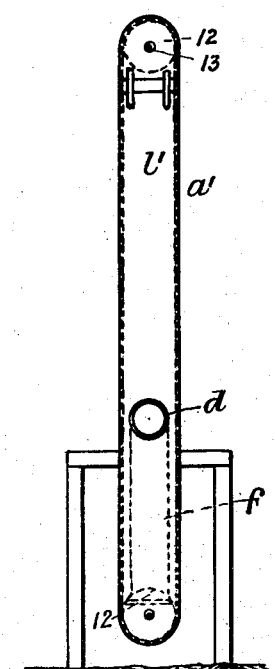
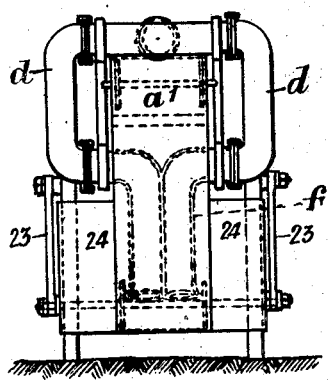
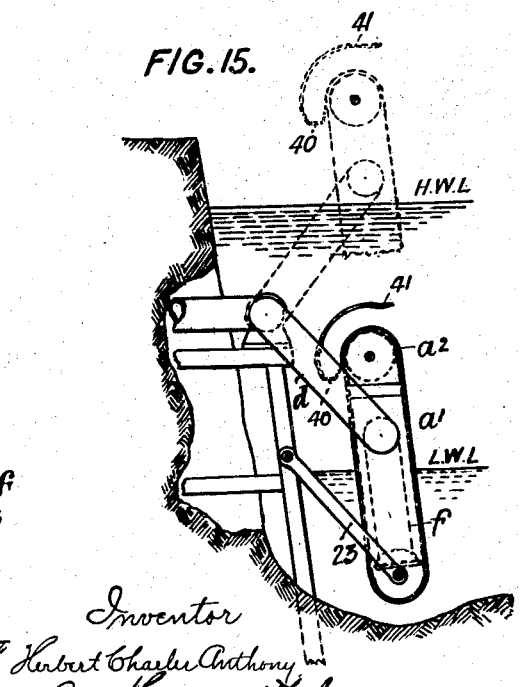

Nov. 4, 1924. 1,513,878
H. C. ANTHONY
STRAINER OR FILTERING DEVICE FOR WATER AND OTHER LIQUIDS
Filed Dec. 23, 1920 7 Sheets-Sheet 7
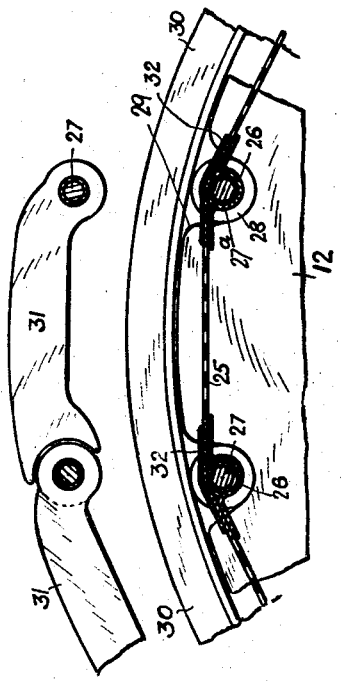
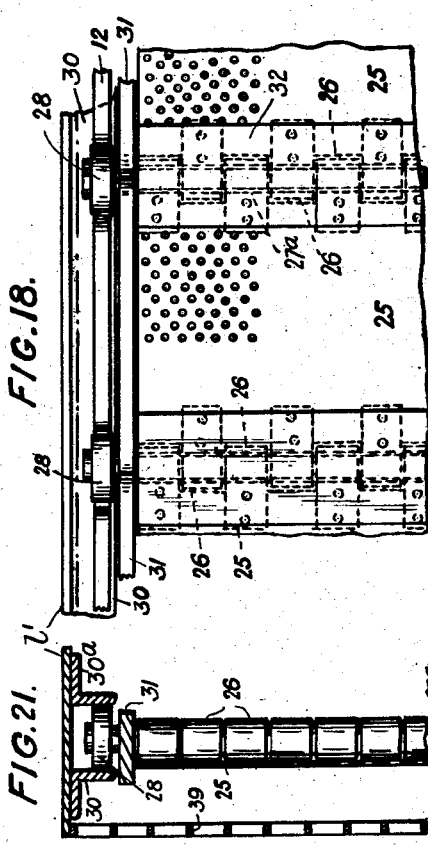
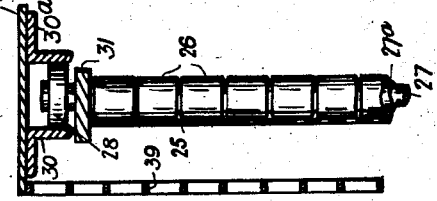
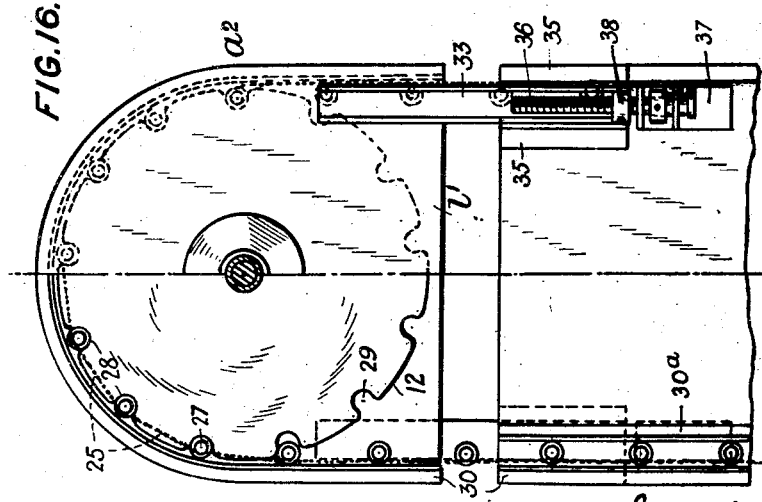
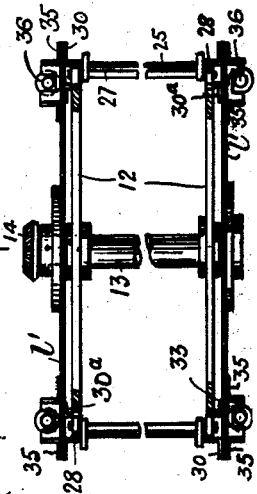

Patented Nov. 4, 1924.

1,513,878

UNITED STATES PATENT OFFICE.

HERBERT CHARLES ANTHONY, OF NEWCASTLE-UPON-TYNE, ENGLAND.

STRAINER OR FILTERING DEVICE FOR WATER AND OTHER LIQUIDS.

Application filed December 23, 1920. Serial No. 432,774.

*To all whom it may concern:*

Be it known that I, HERBERT CHARLES ANTHONY, a subject of the King of Great Britain, residing at 53 Osborne Road, Jesmond, Newcastle-upon-Tyne, Northumberland, England, have invented certain new and useful Improvements in and Relating to Strainers or Filtering Devices for Water and Other Liquids, of which the following is a specification.

This invention comprises improvements in and relating to strainers or filtering devices for water and other liquids, but chiefly applicable for the straining of river water, sewage and other water bearing waste matters, refuse and other objectionable bodies.

More particularly this invention relates to that type of strainer in which a revolving or moving screen traverses all the stream of water entering the draw-off or suction pipe.

The invention principally provides improved means for enabling the working parts proper to be brought above the surface of the water or for enabling such parts to be adjusted relatively to the surface of the water, and improved means for making a seal between the fixed and moving parts of the strainer against the passage of objectionable bodies to the pipe through which the screened water passes, the improvements allowing the working parts of such seal to be brought above the surface of the water.

Heretofore strainers of this nature have been proposed in which the strainer took the form of a cylindrical cage centrally and revolubly mounted on the draw-off pipe. It has also been proposed in connection with strainers of the endless band variety to place the strainer proper in the sides or entry to a permanent underwater chamber, into which the screened water alone could pass, and in the sides of which the draw-off pipe has been arranged so that it could withdraw the screened water from the interior.

One object of the present invention, as applied to those strainers adapted completely in themselves to enclose the entry to the suction pipe, is so to mount the strainer in relation to the draw-off or suction pipe that the depth of immersion of the strainer may be varied as required while in operation, or alternatively it may be arranged to be immersed in the water at a constant but adjustable depth relative to the surface of the water.

Another important object of this invention is so to construct strainers of the type referred to that the sealing surfaces may be kept in close rubbing contact at all parts of the pathway along which the screen travels.

According to this invention, the strainer that encloses the entry to the draw-off pipe is mounted eccentrically on the draw-off pipe, which together with the strainer is arranged to revolve about an axis, so as to vary the depth of immersion of the pipe-end and strainer as required.

The screening device may have combined therewith floating means so that it may remain immersed at a constant depth relative to the surface level of the water when the latter rises and falls with respect to the shore level.

The eccentric mounting of the screen enables the bearings of the strainer to be placed just above the water level so as to be readily accessible for adjustment and repair, while keeping the downwardly depending length of suction pipe within the strainer as short as possible consistent with effective sealing of the inlet against ingress of air, also, so that just so much of the screen area may rise above the surface of the water as will permit of effective cleaning. Moreover, by this means, the screen may be kept as small as possible for any given set of conditions.

There are four cases in which the improvements are applicable, namely in the "fixed" and "floating" types of rotary drum strainer and the "fixed" and "floating" types of endless band strainer. In the drum type, the eccentric mounting allows the drum to be kept as small as possible while securing the desired immersion of the suction pipe and the necessary exposed portion of the strainer above high water level. In the endless band type, the eccentric mounting allows the foregoing ends to be attained as well as allows screens of this type to be revolved so as to bring the underwater part to the surface of the water without unshifting the suction pipe. In the case of the endless band type of screen being of elongated form, the mounting of the screen on the draw-off pipe in an eccentric manner is intended to mean that the pipe emerges from the side of the screen at a suitable point nearer to one end of the screen than the other.

The connection of the revoluble draw-off or suction pipe with the pipe or pipes leading to the shore may be effected by means of any suitable type of swivel joint, which will prevent ingress of air. The preferred form, however, for use in cases where the tension on the joint is not great, comprises an annular water chamber or channel between the parts through which a stream of water is kept circulating. The joint is made hydraulically tight by suitable packing and any air entering the joint will be carried away by the circulating water. This form of joint, of course, is equally applicable, whether the strainer be of the drum type or of the endless band type.

Improved forms of screening band are preferably employed according to the invention, that for the rotary drum type consisting of annular screening plates arranged on the sides of the drum, while in the endless band type, for the purpose of eliminating the usual chain link, bearing roller and plate construction, and obtaining a better seal, the perforated screen plates are knuckled at the ends in the manner of a hinge and the knuckles are adapted to pivot with slight angular movement upon transverse bars carrying the rollers, suitable wearing liners being provided for the knuckles. Special "one hole" links are fitted over the roller bars at the side of the plate to form a seal between the plates and the sides of the screen, as will be more fully described hereinafter.

In order to enable the invention to be readily understood, reference is directed to the accompanying drawings, in which:

Figure 1 shows in side elevation one suitable form of rotary drum strainer of the "fixed" type, constructed according to this invention, and Figure 2 is a central sectional view of the strainer taken at right angles to Figure 1.

Figure 3 is a sectional view illustrative of the construction of the swivel joints for the draw-off pipe or suction pipe.

Figure 8:
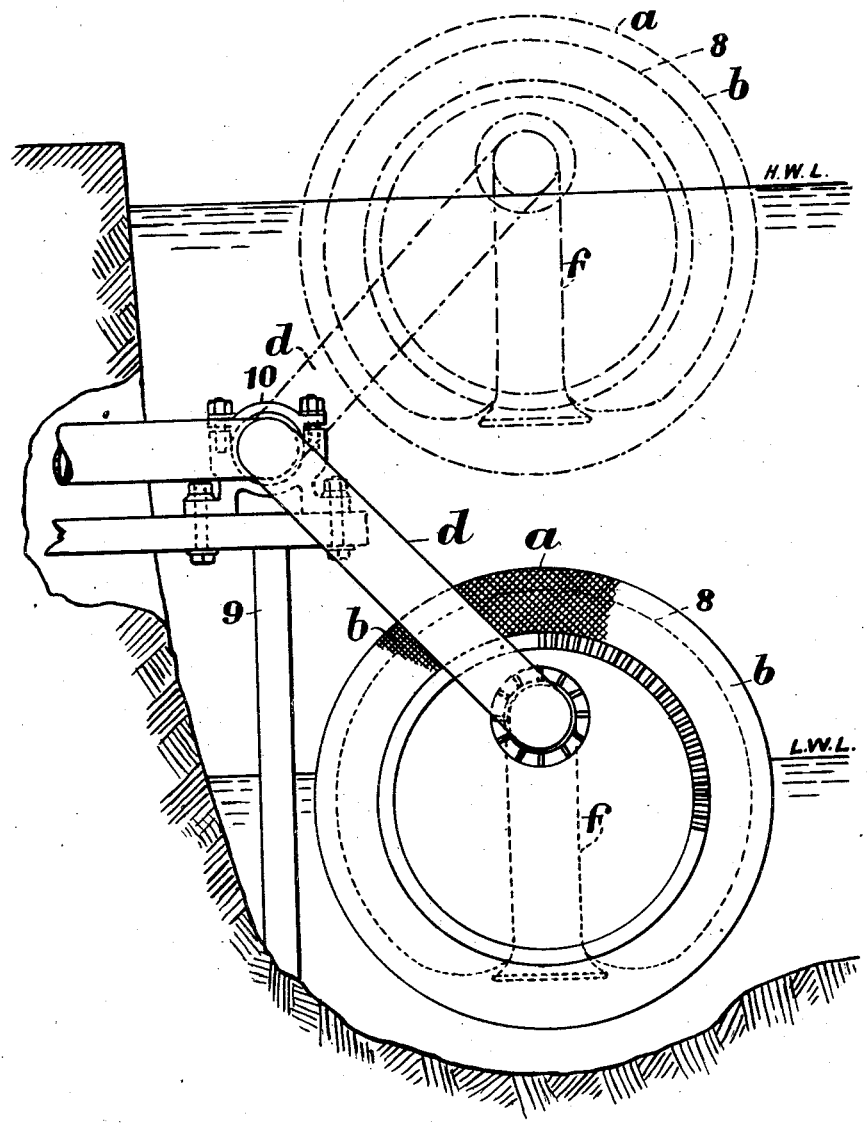

Figure 8 indicates in side elevation a suitable form of rotary drum strainer of the "floating" type.

Figure 9 shows a suitable form of endless band strainer of the "fixed" type, in side elevation.

Figure 10 is an end view, and

Figure 11 is a sectional plan view on the line XI—XI Figure 10.

Figure 12 is a more or less diagrammatic end elevation of a modified form of endless band strainer of the "fixed" type, and Figure 13 is a side elevation.

Figure 14 is an end elevation of a convenient form of endless band strainer of the "floating" type, and Figure 15 is a side elevation of Figure 14.

Figure 16 is a part section and part side elevation, to an enlarged scale, of the upper part of the screen shown in Figures 9 to 15, and illustrating the improved form of endless band arrangement, Figure 17 is a sectional plan of such screen.

Figure 18 is a view on a larger scale of part of the improved form of endless band arrangement.

Figure 19 is a section of Figure 18, omitting the sealing links,

Figure 20 is a view illustrating the construction of the sealing links, and

Figure 21 is a detail sectional view of the strainer band seen in Figures 16 to 20, the section being taken through the straight stretch of band, say along the line XXI—XXI of Figure 9, but the scale being the same as in Figures 18 to 20.

The form of filter device shown in Figures 1 and 2, comprises a rotary drum strainer or screen of the "fixed" type as distinguished from the "floating" type. The strainer comprises a cylindrical drum $a$ having a series of filter plates which together form annular screening plates $b$ on the sides of the drum. The periphery of the drum preferably is imperforate, but alternatively the strainer may have peripherally mounted filter plates only, these filter plates being arranged to incline from the centre plane of the drum outwardly to both sides of the drum. Either arrangement of filter plates gives a larger area for filtering purposes and a vertical or inclined surface to render easier the removal of adherent matter. A draw-off pipe $d$ passes from the screen at either side at a point eccentric of the screen, through a swivel joint $e$, the two draw-off pipes being united within the screen in a single, or as shown, a double depending suction pipe $f$. The construction of the swivel joints $e$ will be fully described hereinafter with reference to Figure 3. The draw-off pipes $d$, after they emerge from the swivel joints $e$, have a right-angle bend towards the shore, and at the swivel joints they are supported in brackets $h$ mounted on a suitable staging $k$. The screen $a$ is suitably provided with side plates $l$, which are fixed on or formed in one with the swivelling suction pipe $f$, and the latter is revolubly mounted in bearings in the brackets $h$. The annular screening plates $b$ aforesaid are secured on their inner peripheries to troughs $m$ which are revoluble on the outer flanges of the side plates $l$, suitable bearings $n$, with lignum vitæ blocks or other bearing surfaces, being provided between the parts. The troughs $m$ serve as dirt troughs for matter removed from the screenings rings by the spray pipes $o$, and hoods $o'$ are suitably fitted opposite the spray pipes to direct such matter into the troughs. One of the troughs is provided with a circular rack $p$ for enabling the screening rings $b$ to be rotated, during the operation of the apparatus, as will be hereinafter described.

Any suitable means may be employed for giving concentric motion to the annular screening plates $b$, on the drum, and eccentric motion to the drum with which moves the swivelling suction pipe $f$. The eccentric motion could, for example, be effected from the upper part $k'$ of the staging $k$ by means of a suitable block and tackle gear, or, as shown, by a hoisting cable $k^2$ and winch $k^3$. The cable is fastened at one end, as at $k^4$, to a side plate $l$ of the drum, passing thence over pulley, rollers or studs $k^5$ on the side plate of the winch $k^3$. The concentric motion could be effected through a vertical shaft $p'$ having a driving wheel $p^2$ at the upper end and a worm or worm wheel $p^3$ at the lower end gearing with the rack $p$ aforesaid. The shaft $p'$ is supported at the upper end in a suitable bearing $p^4$ on the staging $k'$ and at the lower end in a bearing bracket $p^5$ secured to the appropriate side plate $l$ and upon applying motion to the driving wheel $p^2$, say from a motor on shore, the worm or worm wheel $p^3$ operates the rack $p$ and thus effects the desired revolution of the screening rings $b$ on the side plates $l$. Upon disengaging the worm or worm wheel $p^3$ from the rack $p$ and shaft $p'$ from the bracket $p^5$ in any convenient manner, the drum $a$ may be swivelled up eccentrically by means of the block and tackle gear aforesaid until the suction pipe $f$ is above water or in any other desired position and any convenient means may be provided for holding the drum in such position, as will be evident.

The axis of rotation may, if desired, and as shown, be above low water level, in order to facilitate adjustment and repairs. The high and low water levels are indicated by the initial letters H. W. L. and L. W. L. respectively in Figure 1.

The preferred construction of the swivel joints $e$ aforesaid, is shown in Figure 3, wherein fragmentary portions only of the adjoining ends of the fixed draw-off pipe $d$ and the swivelling suction pipe $f$ are shown, the end of the pipe $f$ being enlarged to receive the joint members. A liner $d'$ is shrunk on the end of the pipe $d$, being secured by a ring $d^2$ attached to the pipe $d$ by screws as shown, and a recessed air-tight fitting liner $f'$ is provided within the enlarged end of the pipe $f$. A channeled ring $f^2$ is arranged between the liners $d'$ and $f'$, and forms an annular water channel between the two pipe ends, to which an inlet and an outlet water pipe are connected, a radial baffle being provided in the annular water channel between the water inlet and outlet connections so as to ensure the required flow of the water. On each side of the ring $f^2$, hemp or hydraulic packing $f^3$ and annular cup washers $f^4$ are provided the whole being held in position by the gland ring $f^5$. Some of the water to the spray pipes $o$ aforesaid or from any other suitable source, is bye-passed or passed through the annular channel formed by the ring $f^2$, and any air that gets past the outer leather washers $f^4$ and packing $f^3$ and enters the annular water chamber is immediately led away by the water circulating through the channel to the spray pipe aforesaid.

It will be observed from Figures 1 and 2, that while filtering, the worm or worm wheel $p^3$ can only gear with and operate the rack $p$ if the drum $a$ is immersed to the fullest extent. It will be apparent however, that by suitably modifying the driving gear it could be adapted to rotate the annular screening plates $b$, in any eccentrically adjusted position of the drum. A suitable arrangement of driving gear, operative to rotate the annular plates $b$ in all positions of the drum, will be seen in Figures 4 and 5 together with modified means for eccentrically swivelling the drum. These arrangements, of course, are only given by way of example and the driving of the annular screening plates $b$, and the swivelling of the drum may be effected in any appropriate and convenient manner.

Figure 4:
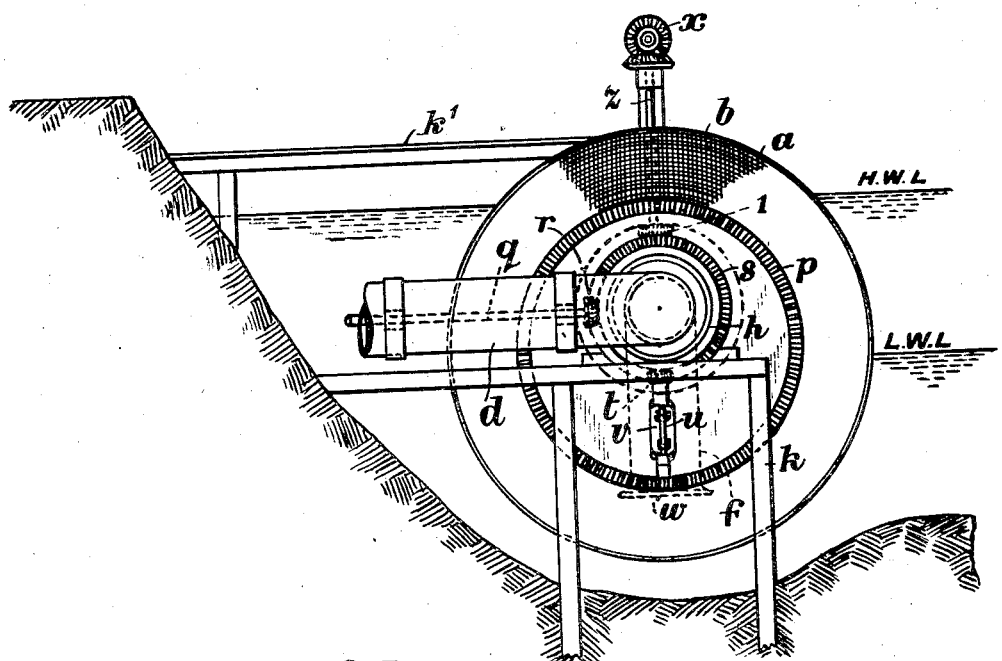
Figure 4 shows a modified form of rotary drum strainer of the "fixed" type.
Figure 5:
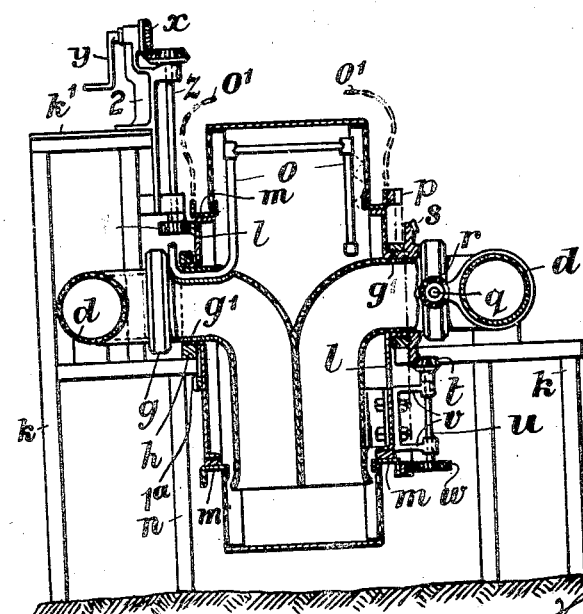
Figure 5 is a central section taken at right angles to Figure 4.

In Figures 4 and 5, the drum parts are practically similar to those seen in Figures 1 and 2 and are therefore indicated by similar reference letters, but the swivelling joints $g$ are of a different construction, and being of known type are only shown more or less diagrammatically, while the side plates $l$ of the drum are separate from the swivelling suction pipe $f$ and are mounted thereon at the sealing joint $g'$. The driving means for giving concentric motion to the annular screening plates $b$ may comprise a shaft $q$ mounted on one of the draw-off pipes $d$ and driven for instance, from a motor (not shown) on the shore. The shaft $q$ transmits its drive through a bevel gear $r$ thereon to a bevel gear $s$ revolubly mounted in any convenient manner upon the swivelling suction pipe $f$ (see Figure 5). The bevel gear $s$ in turn drives another bevel gear $t$ on a shaft $u$ mounted radially of the drum $a$ in brackets $v$ on one side of the drum. The shaft $u$ carries a pinion $w$ meshing with the rack $p$, which upon being rotated, causes the aforesaid motion of the screening plates $b$. The eccentric movement of the screen $a$ may be effected, for example, by means of bevel gears $x$ driven by a handle $y$ or by power, and transmitting their motion through a shaft $z$ and a pinion 1 to a circular rack $1^a$ mounted upon the other side of the screen concentrically to the draw-off pipe. The gears $x$ and the shaft $z$ are suitably mounted upon a bracket or standard 2 on the upper part $k'$ of the staging $k$ and the handle $y$ or its shaft may be suitably secured in whatever position it may be adjusted to. The cylindrical screen $a$ will thus be able to be rotated about its eccentric axis and secured by suitable means in any desired position, until the required submergence of the screen and the end of the suction pipe is obtained. The axis of rotation may as before, be above low water level, in order to facilitate adjustment and repairs.

Figure 6:
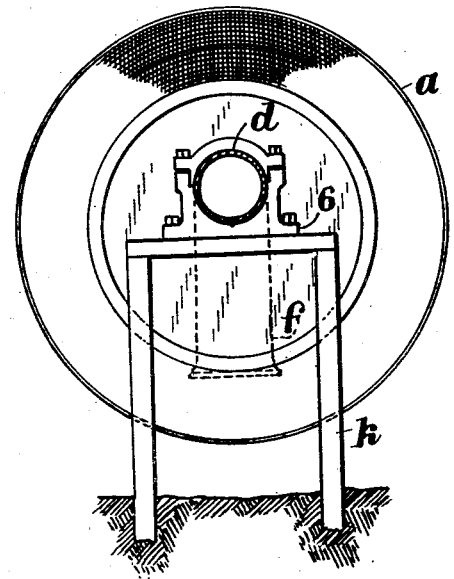
Figure 6 is a more or less diagrammatic elevation of another modified form of rotary drum strainer of the "fixed" type.
Figure 7:
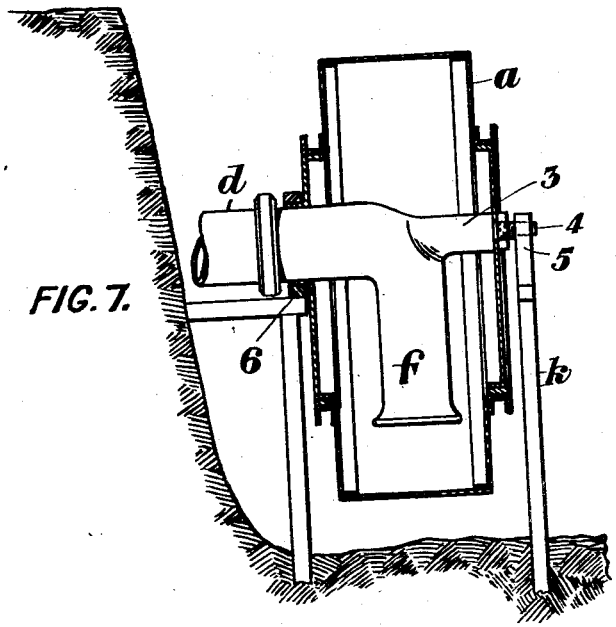
Figure 7 illustrates a central section thereof taken at right angles to Figure 6.

Figures 6 and 7 are illustrative of a suitable modification of the type of strainer shown in Figures 1 and 2 or 4 and 5. In this case, there is only one draw-off pipe $d$, with swivelling suction pipe $f$, passing through one side of the screen $a$, as will be seen from Figure 7, and where the pipe $f$ bends so as to depend downwardly within the screen, it is provided or formed with a bracket or the like 3 for supporting the other side of the screen $a$. The end of the bracket 3 is fashioned to provide a journal 4, which turns in a bracket 5 on the staging $k$, the swivelling pipe $f$ being supported by the bracket 5 and by another bracket 6 on the staging $k$.

The modified form of rotary drum strainer shown in Figure 8 is of the "floating" type. A float chamber 8 may be secured within the cylinder screen $a$, such float chamber suitably comprising a thin metal watertight chamber secured over the suction pipe $f$. The draw-off pipes $d$ in this case issue from the sides of the screen and turn at right angles to a staging 9 on the shore, where they are supported by brackets 10. The pipes are fitted with swivel joints to allow the screen $a$ and draw-off pipes $d$ to swing or pivot, thus enabling the screen to rise and fall with the varying water level. The full lines indicate the position of the screen at low water level (L. W. L.) and the chain lines the position of which might be assumed at high water level (H. W. L.). The water levels shown correspond to the levels of spring tides, the floating type of strainer being particularly advantageous where there is an appreciable rise of tide. The driving means for eccentrically moving the drum $a$ and revolving the annular screening plates $b$ may be on lines similar to those shown in Figures 4 and 5, though both motions would be effected through shafts supported on the draw-off pipes, as will be readily understood.

The invention may also be applied to strainers of the endless band type, in which a series of filter plates supported upon and between endless chains or in any other convenient manner, travel around the perimeters of side plates or frames. Suitable arrangements of this type will now be described with reference to Figures 9 to 15, those shown in Figures 9 to 13 being of the "fixed" type and that shown in Figures 14 and 15 being of the "floating" type.

In Figures 9, 10 and 11, the side plates $l'$ are of elongated shape, though circular side plates may be employed, and the draw-off pipes $d$ pass through the side plates on either side of the screen $a'$ at the desired eccentricity. Swivel joints $g$ or joints of the form shown in Figure 3, are provided near the point of egress of the draw-off pipes from the screen so that the latter may be rotated about these joints to vary the depth of immersion, the draw-off pipes being suitably supported on or near the shore by means of staging $k$ or the like. Rotation of the screen is preferably effected from the upper part $k'$ of the staging by means of a block and tackle gear, or such rotation may be brought about by a shaft 42 mounted on a draw-off pipe $d$ and driven from the shore, the shaft carrying a bevel gear 43 driving a bevel rack 44 fixed on one of the side plates $l'$ or on the suction pipe $f$.

The endless band 11 of filter plates may be caused to travel around the side frames $l'$ by means of any convenient driving mechanism, for instance, the band may be carried by sprocket or gear wheels 12, arranged on transverse shafts 13 mounted in the side plates $l'$, and the upper gear wheels may be driven by means of a bevel gear 14 on the corresponding sprocket shaft 13. The gear 14 meshes with another bevel gear 15 on a shaft 16 suitably mounted in brackets $16^a$ on one of the side plates $l'$, and the lower end of the shaft 16 carries a bevel gear 17 meshing with a bevel gear 18 revolubly mounted on the swivelling part $f$ of the draw-off pipes. The bevel gear 18 may be driven by another bevel gear 19 fixed on a shaft 20 which is mounted on one of the draw-off pipes leading to the shore and from there is driven by means of a motor.

Figures 12 and 13 illustrate diagrammatically a form of filter device similar to that shown in Figures 9 to 11, excepting that a single draw-off pipe $d$ with swivelling part $f$ is used entering and supporting the screen at one side and provided at the place where it bends downwardly in the screen with a bracket or the like 21, which supports the screen at the other side and is formed as a journal 22 for the screen. The arrangement of the suction pipe $f$ with bracket 21 is the same as that shown in Figures 6 and 7 and therefore will need no further description.

The endless band form of filter device may also be constructed to float and for this purpose a suitable construction comprises an endless band strainer constructed similarly to the "fixed" form described with reference to Figures 9 to 11, but having the side plates of a length equal to say six times the width. This construction is illustrated in Figures 14 and 15, from which it will be observed that the strainer $a'$ is supported from the shore by means of a parallel link system with its longer axis approximately vertical. The upper members of the link system are comprised by the swinging draw-off pipes $d$ and the lower members by suitable connecting arms 23, pivotally attached to the lower portions of the side frames of the screen, and to the staging $k$ on the shore. A suitable float chamber or chambers is or are provided, Figure 14 showing two float chambers 24, supported one on each side of the lower portion of the screen. By altering the disposition of the connecting arms 23 in relation to the shore in any convenient manner, the extent and angle of immersion may be adjusted as desired, while the filter device $a'$ will rise and fall with the varying water level at a constant angle to the vertical, as will be understood.

The improved form of endless band arrangement preferred for use with the constructions shown in Figures 9 to 15, is illustrated in Figures 16 to 21. The endless band comprises a number of perforated filter plates 25 so formed at each end as to provide knuckles 26, the interfitting knuckles of adjoining plates being jointed together to allow of the slight angular movement of the plates with respect to each other, by means of bars 27 carrying rollers 28 at their ends, see particularly Figures 18, 19 and 21. The bars 27 are suitably fitted with wearing liners 27ª for the knuckles of the screen plates. Through the medium of the roller bars 27 and rollers 28, the filter plates are carried by the gear wheels or sprockets 12, the upper one only of which is shown in Figure 16. The sprockets have approximately semi-circular recesses 29 for receiving and engaging the rollers 28 and the band is adapted to be held in place by the engagement of the rollers with inner and outer angle irons 30, 30ª fixed around the perimeters of the side plates $l'$ as will be understood from Figures 16 to 18 and 21, the inner angle irons 30ª being discontinued where the sprocket wheels engage the rollers 28 (see Figure 16). In order to provide sealing means between the screen plates 25 and the side plates $l'$, sealing links 31 are employed of the form shown in Figure 20 and these links, as will be seen from Figures 18 and 21 form a seal between the filter plates 25 and the edge of the angle irons 30. It will be noticed that these sealing links have a pivot hole at one end only for fitting over the roller bars 27, the other end being fashioned to pivot upon or with respect to the perforated end of the next link. The hinge joints between the filter plates may be fitted with loose fitting covers 32 as shown in Figures 18 and 19. To provide for stretching or adjustment of the endless filter band, the screen is suitably provided with a separate head portion $a^2$, seen in Figures 9, 13, 15 and 16, and as will be clearly seen from Figures 16 and 17, this head portion is adjustably secured to the lower body portion of the screen by means of channel-bars 33 adapted to fit and slide between parallel angle irons 35 secured to the lower body portion of the screen. The adjustment of the head portion $a^2$ to stretch or loosen the endless filter band 11 is effected by means of screws 36, each of which is revolubly mounted on a base 37 on the lower body portion of the screen and engages a nut member 38 formed on the plates or bars 33. Alternatively, the sprocket bearings alone may be mounted in slideways and be adjustable by means of a screw. The bevel gear 15 aforesaid is slidably feathered on its shaft 16 so as to allow the adjustment of the head portion of the screen while maintaining engagement with the bevel gear 14.

Obviously, any suitable form of endless filter band may be employed, as will be readily understood, but the improved form above described is advantageous, as it dispenses with the usual chain link, roller and plate construction and effectively seals the filter plates when travelling round the sprockets.

As shown in elevation in Figures 9 and 10, and in section in Figure 21, the endless band type of filter may be provided with a rough screen 39 as a projection for the filter band 11. Also a trough or the like 40, with a shield or hood 41, may be provided for the reception of matter removed from the filter band 11.

I claim:

1. A strainer for water and other liquids, comprising a filter screen, a draw-off pipe having its open end enclosed by the screen and the latter eccentrically mounted thereon, and means permitting the screen to be revolved eccentrically about the axis of the draw-off pipe to vary the depth of immersion of the screen.

2. A strainer for water and other liquids, comprising a filter screen, a draw-off pipe having a revoluble end part projecting into the screen and upon which the screen is eccentrically mounted and means for revolving said end part of the draw-off pipe so as to vary the depth of immersion of the pipe end and screen.

3. A strainer for water and other liquids, comprising a filter screen provided with an endless travelling filter surface driving means for effecting travel of said filter surface, a draw-off pipe having its open end enclosed by the screen and the latter eccentrically mounted thereon, and means permitting the screen to be revolved eccentrically about the axis of the draw-off pipe to vary the depth of immersion of the screen.

4. A strainer for water and other liquids, comprising a filter screen, a draw-off pipe having its open end enclosed by the screen and the latter eccentrically mounted thereon, and bearings for said screen arranged above the water level and permitting the screen to be revolved eccentrically about the axis of the draw-off pipe to vary the depth of immersion of the screen.

5. A strainer for water and other liquids, comprising a filter screen, a draw-off pipe having a revoluble end part projecting into the screen, and upon which the screen is eccentrically mounted, and bearings for said end part of the draw-off pipe, said bearings being above the water level and permitting adjustment of said end part of the draw-off pipe so as to vary the depth of immersion of the pipe end and screen.

6. A strainer for water and other liquids, comprising a screen having an endless filter band formed of screen plates hingedly jointed together, a draw-off pipe having its open end enclosed by the screen and the latter eccentrically mounted thereon and means permitting the screen to be revolved eccentrically about the axis of the draw-off pipe to vary the depth of immersion of the screen.

7. A strainer for water and other liquids, comprising side members, a band of screen plates arranged around the perimeter of said side members, pivot bars for hingedly connecting said plates together, rollers on said pivot bars, tracks for said rollers on said side members, sprockets adapted to engage said rollers, and supported in said side members, means for driving said sprockets, a suction pipe for drawing off water from the space within said band, and an eccentric mounting for said side members permitting same to swivel on an eccentric axis, substantially as set forth.

8. A strainer for water and other liquids, comprising supporting members, an endless travelling band of hingedly connected, screen plates arranged upon said supporting members, series of horizontal pivotal links forming a seal between the edges of the band and said supporting members, driving means for said band, and a suction pipe for drawing off water from the space within the band.

9. A strainer for water and other liquids, comprising supporting members, an endless travelling band of screen plates, arranged upon said supporting members, pivot bars hingedly connecting said plates, links pivoted upon said bars at the edges of the band for forming a seal between said edges and said supporting members, driving means for said band, and a suction pipe for drawing off water from the space within the band.

10. A strainer for water and other liquids, comprising supporting members, an endless travelling band or screen plates, arranged upon said supporting members, pivot bars hingedly connecting said plates, links for forming a seal between the edges of said band and said supporting members, said links each being pivoted at one end on one or other of said pivot bars, and at the other end having pivotal engagement with the end of an adjoining link, driving means for said band, and a suction pipe for drawing off water from the space within the band.

11. A strainer for water and other liquids, comprising side plates, an endless travelling band of screen plates arranged around the perimeter of said side plates, pivot bars for hingedly connecting said screen plates together, links for forming a seal between the edges of said band and said side plates, said links each being pivoted at one end on one or other of said pivot bars and at the other end having pivotal engagement with the end of an adjoining link, driving means for said band, a suction pipe having its open end enclosed by said side plates and band, and an eccentric mounting for said side plates permitting adjustment thereof on an eccentric axis, substantially as set forth.

12. A strainer for water and other liquids comprising side plates, an endless travelling band of screen plates arranged around the perimeter of said side plates, pivot bars hingedly connecting said screen plates together, rollers upon said pivot bars, tracks for said rollers arranged upon the perimeter of said side plates, series of pivotal links carried by said pivot bars and forming a seal between the edges of said band and said side plates, sprockets adapted to engage said rollers, driving means for said sprockets, a suction pipe having its open end enclosed by said side plates and said band, and an eccentric mounting for said side plates permitting same to be revolved about an eccentric axis, substantially as set forth.

13. A strainer for water and other liquids, comprising a filter screen, a draw-off pipe leading from the screen, and a swivel joint in the draw-off pipe, said swivel joint comprising an annular chamber through which water is circulated for the purpose described.

14. A strainer for water and other liquids, comprising a filter screen, a draw-off pipe having a revoluble end part projecting into the screen and upon which the screen is mounted, and a swivel joint between the revoluble and stationary parts of said pipe comprising an annular chamber through which water is circulated for the purpose described.

HERBERT CHARLES ANTHONY.